United States Patent [19]
Tanis et al.

[11] Patent Number: 5,810,956
[45] Date of Patent: Sep. 22, 1998

[54] METHOD OF FILLING A SEAM OF A PANEL ASSEMBLY USING A THIXOTROPIC POLYURETHANE ELASTOMERIC FILLER ADHESIVE

[75] Inventors: Rick A. Tanis, Lapeer; N. Keith Merser, North Branch; Peter K. Hyde-Smith, Mayville, all of Mich.

[73] Assignee: ITW Foamseal, Inc., Oxford, Mich.

[21] Appl. No.: 673,571

[22] Filed: Jul. 1, 1996

[51] Int. Cl.$^6$ .................. B32B 31/20; E04B 2/00
[52] U.S. Cl. .................. 156/71; 156/244.22; 156/295; 156/304.1; 156/331.7; 264/261
[58] Field of Search .................. 156/71, 244.11, 156/244.22, 244.24, 295, 304.1, 331.7; 264/261; 52/416, 417

[56] References Cited

U.S. PATENT DOCUMENTS

| | | |
|---|---|---|
| 3,842,551 | 10/1974 | Shull, Jr. et al. . |
| 4,108,791 | 8/1978 | Wasilczyk . |
| 4,217,422 | 8/1980 | Wasilczyk . |
| 4,235,952 | 11/1980 | Holmes et al. ............... 156/159 |
| 4,240,919 | 12/1980 | Chapman . |
| 4,275,172 | 6/1981 | Barth et al. . |
| 4,373,082 | 2/1983 | Kimball et al. . |
| 4,392,336 | 7/1983 | Ganssle . |
| 4,436,862 | 3/1984 | Tetenbaum et al. . |
| 4,451,605 | 5/1984 | Theodore . |
| 4,551,498 | 11/1985 | Yeater et al. . |
| 4,668,535 | 5/1987 | Liggett et al. ............... 427/230 |
| 4,677,179 | 6/1987 | Hannemann ............... 528/45 |
| 4,791,168 | 12/1988 | Salatin et al. . |
| 4,971,837 | 11/1990 | Martz et al. . |
| 5,066,733 | 11/1991 | Martz et al. . |
| 5,088,260 | 2/1992 | Barton et al. . |
| 5,124,372 | 6/1992 | Katona et al. ............... 523/200 |
| 5,169,542 | 12/1992 | Kaettlitz et al. . |
| 5,175,228 | 12/1992 | Wang et al. . |
| 5,229,454 | 7/1993 | Weichmann ............... 524/714 |
| 5,230,200 | 7/1993 | Douglas et al. . |
| 5,250,580 | 10/1993 | Parsonage et al. . |
| 5,290,632 | 3/1994 | Jadhav et al. ............... 428/423.1 |
| 5,310,766 | 5/1994 | Baumann et al. ............... 521/130 |
| 5,338,767 | 8/1994 | Startelet et al. ............... 521/159 |
| 5,340,901 | 8/1994 | Wang . |
| 5,354,609 | 10/1994 | Wang . |
| 5,385,966 | 1/1995 | Hermansen et al. . |

FOREIGN PATENT DOCUMENTS 5412118  1/1979  Japan .

*Primary Examiner*—Richard Crispino
*Attorney, Agent, or Firm*—Howard & Howard

[57] ABSTRACT

A method of filling a seam of a structural panel assembly utilizes a non-foaming, thixotropic, two-component polyurethane elastomeric material. The thixotropic, elastomeric material is prepared by rapidly mixing and initiating the reaction of a first thixotropic component comprising an isocyanate-terminated compound having at least two reactive isocyanate groups and a second thixotropic component comprising a hydroxyl-terminated compound having at least two reactive hydroxyl groups. Each of the first and second thixotropic components include from about 3% to 8% by weight fumed silica. The second thixotropic component also includes from about 10% to about 50% filler. The thixotropic elastomeric material is applied over the seam of a panel assembly. The method then includes fluidizing the thixotropic elastomeric material and driving the thixotropic elastomeric material into the seam of the panel assembly. The thixotropic elastomeric material is then allowed to cure in the seam, thereby sealing and reinforcing the seam of the panel assembly.

35 Claims, 2 Drawing Sheets

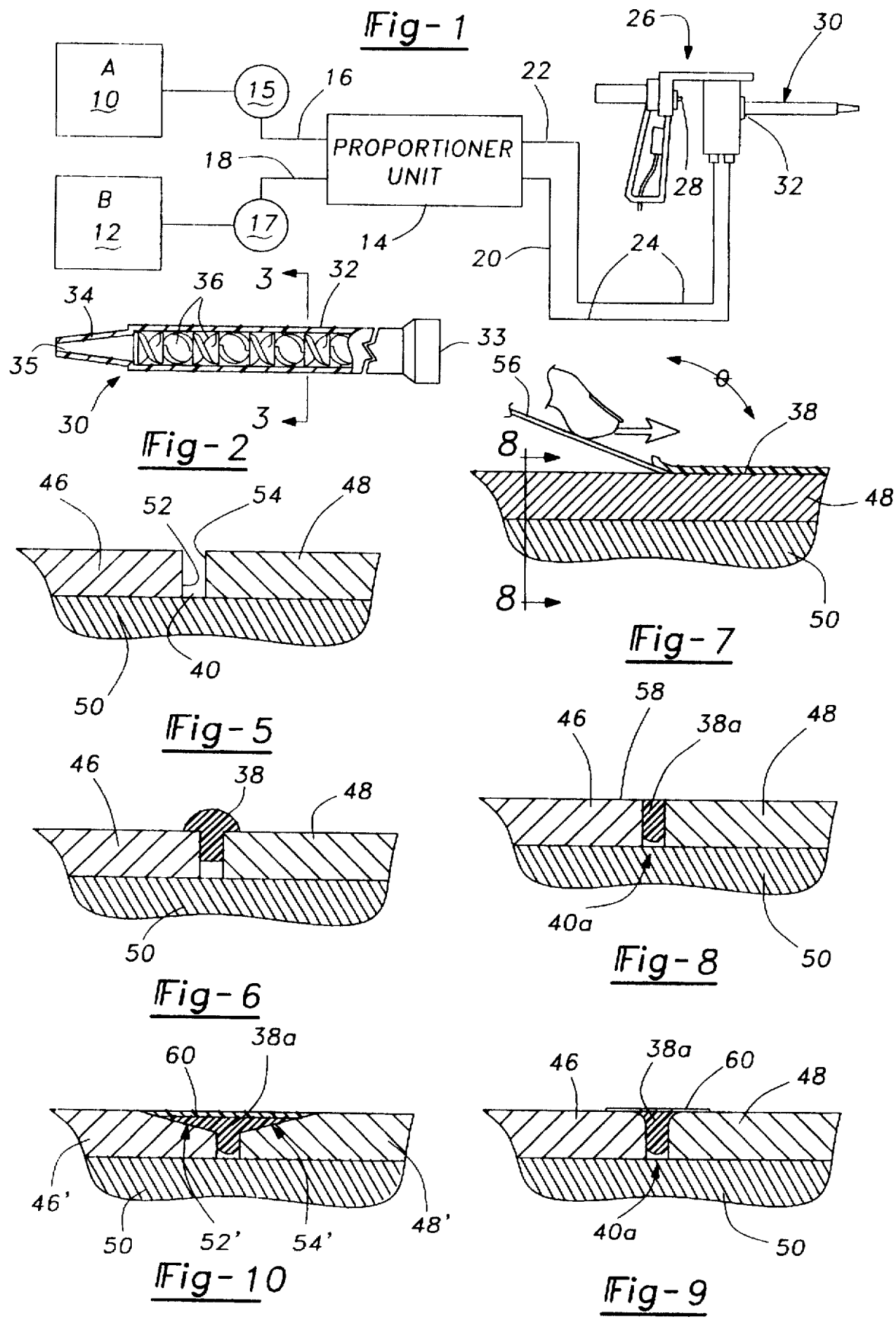

METHOD OF FILLING A SEAM OF A PANEL ASSEMBLY USING A THIXOTROPIC POLYURETHANE ELASTOMERIC FILLER ADHESIVE

BACKGROUND OF THE INVENTION

The present invention relates generally to a method of filling an opening, seam or void in a substrate, panel or structural panel assembly using thixotropic elastomeric materials. More specifically, this invention relates to a method of filling a seam of a structural panel assembly using a non-foamable, thixotropic, preferably two-component polyurethane elastomeric material. The polyurethane elastomeric material can be applied to substrates or panels such as wood, gypsum panels, plywood, oriented strand board, and other common building materials, and may be used to adhere similar or dissimilar materials. The polyurethane elastomeric material structurally reinforces the openings, seams or voids in a substrate, panel or structural panel assembly to provide a strong bond between the panel members and a smooth outer surface on a structural panel assembly which is ready to receive paint or any other surface coating material.

A variety of materials currently exist which can be used for seam sealing, void filling, or reinforcement of seams or voids in structural panel assemblies. An illustrative list includes moisture cure, single-component adhesives, air dry adhesives, silicone, latex or vinyl caulk adhesives and fillers, epoxy adhesives, drywall mud, cementicious mortars, and nails and screws. Moisture cure single-component adhesives are generally slow curing and have no mechanism for controlling the cure rate during the application process. The cure rate is also dependent on ambient temperature and humidity. Air dry adhesives usually contain solvents to control the cure process. Thus, for such air dry adhesives, the cure rate is dependent on ambient temperature and humidity. Further, these single-component adhesives are not thixotropic, making them ill-suited for seam sealing and void and hole filling. Silicone, latex or vinyl caulks are also slow curing and usually do not provide significant strengthening to a panel having a seam or void. Many of the above compounds may prohibit the application of exterior coatings due to an incompatibility between the coating and the seam-filling material. Epoxies are hard and brittle, making them unsuitable for most applications where there is regular movement, i.e., expansion and contraction of the substrate. Epoxies are also generally very expensive. Drywall mud is brittle, adds no strength to the composite structure and often requires multiple applications. Cementicious mortars are also brittle, add little strength and often take more than a day to cure. Nails and screws are generally destructive in their application, creating holes in the substrate which may require further patching.

As the housing market continues to grow, conventional houses are becoming more expensive and increasingly beyond the means of the median home buyer. In response to the demand for lower cost housing, a rapid growth in manufactured and modular homes has resulted. In this market, there is a constant demand for more efficient and less expensive building processes to keep housing affordable. Since labor constitutes a large portion of the cost of a home, any process which reduces construction time will generally reduce the cost of the home. The finish work, such as dry-walling, painting and trim work, is the most labor and time-intensive and requires the most skilled labor. Hanging and finishing drywall is very time-consuming and labor-intensive. In a typical process, a large gypsum board is nailed or screwed onto the studs of a panel assembly. The seams are then taped and two or three coats of joint compound or "mud" are applied to the panel assembly along the seam to provide a quality finish adequate for applying a coat of paint. In between each application of mud, the mud must be permitted to dry and be sanded to provide a smooth finish. The nail or screw holes must also be filled in with mud and sanded. In humid climates or during humid seasons, the process of taping, mudding and sanding may take several days. In mass production of manufactured homes, for example, this results in substantial time delays, loss of working floor space and additional expense. Batten strips are thus commonly used by the manufactured home industry in an attempt to hide the seams between adjacent panels, which are unsightly.

The prior art has not successfully addressed these problems. Thus, it would be desirable to develop a method which eliminates a need for tape, multiple coats of joint compound and sanding. It would also be desirable to develop a method for producing a stronger wall panel assembly than the present methods of construction. It would also be desirable to develop a method for reducing the overall finish time of panel assemblies and reduce the labor requirements of this process.

SUMMARY OF THE INVENTION

The present invention provides a method of adhering similar or dissimilar materials using a non-foamable thixotropic, preferably two-component, polyurethane elastomeric material. In particular, the present invention relates to a method of filling a void, opening or seam in a substrate, panel or preferably a structural panel assembly having a plurality of panel members wherein the thixotropic polyurethane elastomeric material fills the seam between the panels to provide a stronger bond between the adjacent panel members of the panel assembly. The structural panel assembly includes a plurality of panel members having adjacent side edges preferably in generally abutting edge-to-edge relation. The seam is formed at the juncture of the edges of a pair of panel members. As used herein, "seam" may also include cracks, holes gaps or voids present in a structural panel assembly. The present invention also provides structural reinforcement of the seams or voids between the panel members of the panel assembly thereby providing a more stable, structurally reinforced panel assembly.

The preferred fast-curing, thixotropic polyurethane elastomeric material used in the method of the present invention is prepared by rapidly mixing and initiating the reaction of an isocyanate-terminated compound or polymer with a hydroxyl-terminated compound or polymer. Each of the reactive components, i.e., the isocyanate-terminated and hydroxyl-terminated compounds, are thixotropic and are preferably mixed directly in a dispense gun assembly used to apply the elastomeric material to the substrate. A first thixotropic component comprises an isocyanate-terminated compound having at least two reactive isocyanate groups and from about 3% to 8% by weight hydrophobic fumed silica. A second thixotropic component comprises a hydroxyl-terminated compound having at least two reactive hydroxyl groups and, by weight, from about 3% to 8% hydrophobic fumed silica and from about 10% to 50% filler. The two-component thixotropic polyurethane elastomeric material is preferably dispensed from the dispense gun assembly through a static mixer nozzle assembly comprising an elongate tube having a spout and an entry port and a plurality of helical members disposed longitudinally in the tube between the spout and the entry port. Each of the helical members is turned 90° relative to adjacent helical members.

The elastomeric material of the present invention may function as a seam filler or adhesive or both depending on the application. As used herein, the term "elastomeric material" may be taken to mean seam filler or adhesive. Thus, the elastomeric material may function as an adhesive to bond the edges of abutting panel members together. The elastomeric material may alternatively function as a seam filler to fill voids, seams or gaps in a panel assembly. The elastomeric material is particularly useful in bonding fibrous or particulate substrates such as gypsum boards, plywood and oriented strand board to each or to other common building materials. When used as a seam filler, the elastomeric material of the present invention preferably contains titanium dioxide or other dye, pigment or colorant at a level of about 1% to 5%. Titanium dioxide tints the elastomeric material such that it provides a smooth surface which can be painted without showing through.

In a preferred method of the present invention, a fast-curing two-component non-foaming thixotropic polyurethane elastomeric material is prepared by rapidly mixing and initiating the reaction of the isocyanate component and the hydroxyl component and then applying the thixotropic elastomeric material over the seam of a panel or panel assembly. The thixotropic elastomeric material is then fluidized and driven into the seam of the panel assembly. In a preferred method the thixotropic elastomeric material is driven into the seam by subjecting the thixotropic elastomeric material to a shearing stress, such as by sliding a putty knife longitudinally along the seam at an oblique angle. This shearing stress causes the elastomeric material to fluidize and penetrate the seam. A small portion of the thixotropic elastomeric material may be scraped off the panel assembly by the putty knife. The thixotropic elastomeric material is then allowed to cure in the seam, thereby sealing and reinforcing the seam of the panel assembly. A relatively thin layer of mud may be applied over the filled seam to provide a better surface for receiving a paint composition.

The second thixotropic component comprising a hydroxyl-terminated compound may comprise from about 3% to 8% hydrophobic fumed silica and from about 10% to 50% filler, wherein said filler has an average particle size of from about 0.2 to 200 microns and a bulk density of from about 5 to 100 lbs/cubic foot. The second thixotropic component may further comprise from about 0.04% to 0.2% catalyst. The second thixotropic component may also comprise from about 1% to 9% moisture scavenger. Either of the first or second thixotropic components may comprise an additive selected from the group consisting of colorants, light stabilizers, surfactants, UV absorbers, anti-oxidants, thermostabilizers and mixtures thereof. These and other features of the present invention will be best understood from the following specification and drawings, of which the following is a brief description.

BRIEF DESCRIPTION OF THE DRAWINGS

FIG. 1 is a schematic representation of an apparatus suitable for applying the elastomeric material of the present invention.

FIG. 2 is a partial, cross-sectional side view of a dispense gun nozzle assembly used to apply the elastomeric material of the present invention.

FIG. 5 is a cross-sectional view of a pair of abutting panel members of the wall panel assembly of FIG. 4 along view lines 5—5.

FIG. 6 is a cross-sectional view of the panel assembly along view lines 6—6 including a bead of an elastomeric material of the present invention overlaying the seam formed between the edges of the panel members.

FIG. 7 is a cross-sectional view of the panel assembly during a step of the method of the present invention.

FIG. 8 is a cross-sectional view of the panel assembly along view lines 8—8 in FIG. 7 after filling the seam with the elastomeric material of the present invention.

FIG. 9 is a cross-sectional view of the panel assembly of FIG. 8 following a coating step of a method of the present invention.

FIG. 10 is a cross-sectional view of an alternative panel assembly in accordance with the present invention.

DETAILED DESCRIPTION OF A PREFERRED EMBODIMENT OF THE INVENTION

Figure 4:
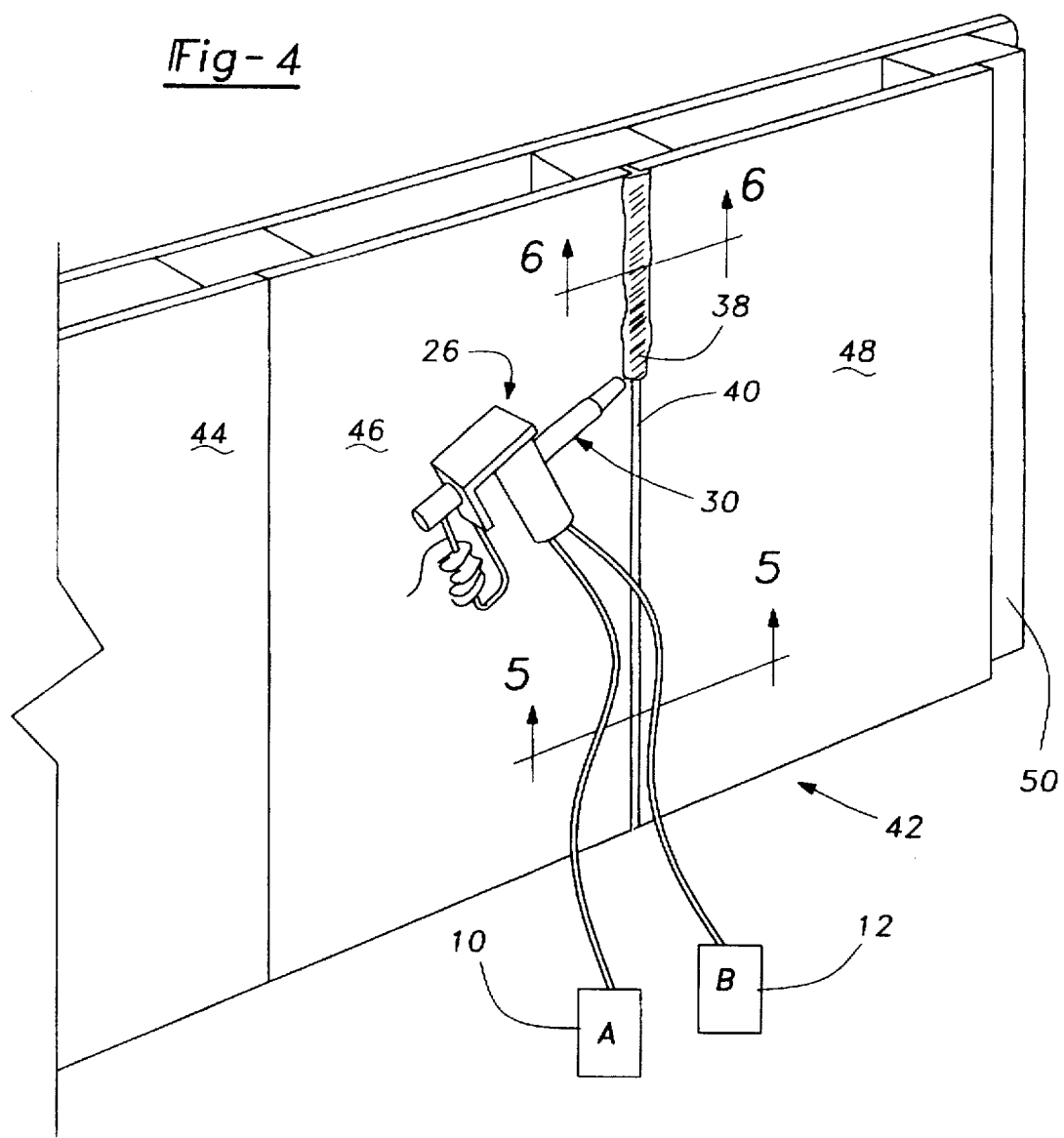
FIG. 4 illustrates the application of the elastomeric material of the present invention over the seam of a typical wall panel assembly.

This invention relates to a fast-curing, non-foamable, thixotropic, preferably two-component polyurethane elastomeric material which can be applied to a seam of a panel or panel assembly of the type commonly found in the manufactured or modular home market to form a reinforced, smooth seam in a panel or panel assembly. The thixotropic, polyurethane elastomeric material can also be applied to voids, cracks or gaps in such panel or panel assemblies to fill and reinforce such voids, cracks or holes or gaps and provide a structurally stable panel assembly having a smooth exposed surface. As used herein, the term "seam" includes any void, crack, gap, hole or seam of the type found in a panel or panel assembly, particularly those found on an exposed surface of a panel assembly. The method of the present invention will be described in terms of filling or sealing a seam of a panel assembly; however, it should be understood that the invention applies equally to filling, packing, plugging or sealing any void, crack, gap or hole in a panel or panel assembly of the types described.

The preferred elastomeric material of the present invention is prepared by mixing and reacting the A and B components of a fast-curing, non-foamable, thixotropic, polyurethane elastomeric material. The A component comprises an isocyanate- terminated compound or polymer containing at least two reactive isocyanate groups. The B component comprises a hydroxyl-terminated polymer or compound having at least two reactive hydroxyl groups. Each A and B component further comprises other constituents which provide thixotropy to the component and to the resultant elastomeric material. Preferably, the mixing of the two reactants is effected directly within the static mixer nozzle assembly of the dispense gun and dispensed through a spout of the static mixer nozzle assembly. The two reactive components are mixed immediately before being applied to the surface of a panel assembly. FIG. 1 is a schematic representation of an apparatus suitable for applying the elastomeric material of the present invention. A source of the isocyanate-terminated compound 10 and a source of the hydroxyl-terminated compound 12 are separately connected to a control unit 14 by lines 16 and 18, respectively. Pumps 15 and 17 are located in lines 16 and 18, respectively, to transfer the thixotropic reactants to the control unit 14. Control unit 14 allows precise and accurate control of the relative amounts, temperatures, and pressures of the two reactants fed to the dispense gun assembly 26. The isocyanate-terminated compound from source 10 is fed through line 16 by pump 15 into control unit 14 and then through line 22 to dispense gun assembly 26. The hydroxyl-terminated compound is similarly fed from source 12 through line 18 by pump 17 into control unit 14 and then through line 20 to dispense gun assembly 26. Preferably, lines 20 and 22 are physically connected or bundled (i.e., bundled line 24) at some point after exiting from the control unit 14 to minimize tangling of the separate lines. Bundled line 24 is connected directly to dispense gun assembly 26 which is equipped with a trigger 28 to activate the mixing and dispensing action.

Figure 3:
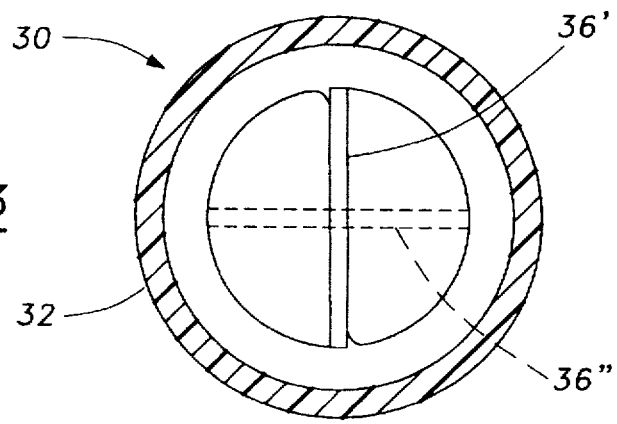
FIG. 3 is a cross-sectional view of the dispense gun nozzle assembly of FIG. 2 along view lines 3—3.

In the disclosed embodiment, the components of the elastomeric material are mixed in and dispensed through a static mixer nozzle assembly 30 of a dispense gun 26. Dispense gun nozzle assembly 30 must provide thorough mixing of the thixotropic A and B components of the elastomeric material. Preferably, nozzle 30 provides a relatively thin bead of elastomeric material without splatter. As shown in FIGS. 2 and 3, dispense gun nozzle assembly 30 includes an elongate tube 32 having a narrowed spout 34 through which the elastomeric material is dispensed. A plurality of helical shaped mixing members 36 are disposed longitudinally in tube 32. Mixing members 36 are arranged longitudinally in a row in tube 32. Each member 36 is turned 90° relative to the adjoining members. Thus, as shown in FIG. 3, member 36' is turned 90° relative to member 36". This arrangement of mixing members 36 provides excellent mixing of the components of the elastomeric material and results in a thoroughly-mixed, non-foaming, thixotropic, two-component polyurethane elastomeric material which is dispensed from spout 34 of the dispense gun nozzle assembly 30, preferably as a thin bead. As the components of the elastomeric components material travel down the dispense gun nozzle assembly 30 from an entry port 35 toward spout 34, the components are progressively mixed and ultimately result in a thoroughly mixed two-component polyurethane elastomeric material which is preferably dispensed in the form of a bead. The bead preferably has a cross-sectional width of from about ⅛" to ½", most preferably from about ⅛" to ¼". The elastomeric material may be applied as a ribbon or flattened bead for seams having a wider dimension.

The dispensed fast-curing elastomeric material is applied directly to the surface of the panel assembly. The reactive components of the elastomeric material are mixed directly in the dispense gun nozzle assembly 30 as described above. Suitable dispense guns are commercially available. One particularly preferred dispense gun is a Mixpac DP 200-70 or DP400 dispense gun from Con Pro Tec, Inc. of Salem, N.H. The control unit 14 is also commercially available. Especially preferred control units are available from Sealant Equipment of Wayne, Mich. These units can typically supply and deliver about 5 to 30 pounds of material per minute at a pressure of about 500 to 1000 psi. Generally, an output rate of about 20 to 30 pounds/minute at about 800 psi is preferred. These proportioners include pumps and temperature and pressure controls for accurate metering and control of the raw materials to the dispense gun apparatus. Pumps 15 and 17 used to transfer reactants to the control unit 14 are also commercially available. Preferred pumps 15 and 17 include air-driven transfer pumps having a pump ratio of about 23:1 to 40:1 from Aro of Bryan, Ohio.

FIG. 4 shows a worker applying a bead 38 of elastomeric material to a seam 40 of a panel assembly 42 in accordance with a process of the present invention. Panel assembly 42 comprises a series of panels 44, 46, 48 which are received on structural support members 50 such as studs. Panels 44, 46, 48 are generally disposed on structural support members 50 in edge-abutting generally co-planar fashion. In a preferred method, panel assembly 42 is formed using the preferred vacuum table method described in U.S. patent application Ser. No. 08/089,726. Seam 40 is defined by the abutting edges of adjacent panel members 46, 48. Preferably, the abutting edges of adjacent panel members 44, 46, 48 are located on panel assembly 42 adjacent a stud 50, such that wall stud 50 supports the edges of panels members and seam 40.

As shown in FIG. 5, wall stud 50 supports the abutting edges of adjacent panel members 46, 48. The nearly abutting lateral edges 52, 54, of panel members 46, 48, respectively, define and form seam 40. Panel members 46 and 48 may be secured to wall stud 50 in a conventional manner, but are preferably secured to wall stud 50 according to the method described in U.S. Pat. No. 5,425,908 of Merser. Thus, panel members 46 and 48 are generally in co-planar orientation.

As shown in FIG. 6, a bead 38 of elastomeric material of the present invention is applied to the seam 40 of the panel assembly 42 along substantially the entire length of panel members 46 and 48. Because the elastomeric material of the present invention is thixotropic, as described further below, the non-foaming bead 38 is relatively fluid upon exiting spout 34 of static mixer assembly 30. The shear force applied to the elastomeric material by the static mixer nozzle assembly 30, particularly at the outlet 35 of the nozzle assembly 30 provide the elastomeric material with relatively fluid characteristics and allow the bead 38 to penetrate at least a portion of seam 40. As is known for thixotropic materials, however, bead 38 sets up relatively quickly when at rest to a gel form.

As shown in FIG. 7, a shear force is then applied to the thixotropic elastomeric bead 38 so as to fluidize the elastomeric material. This can be accomplished by disturbing or agitating the elastomeric material as by applying a shear force to the elastomeric material. In one preferred embodiment, a putty knife 56 is slid longitudinally along seam 40 at an oblique angle $\theta$ measured between the panel member 48 and the putty knife 56. As is know for thixotropic materials, the elastomeric material exhibits fluid-like characteristics when disturbed or agitated as by applying a shear force to the elastomeric material; however, relatively soon after the shear force or agitation is discontinued, the elastomeric material sets up with gel-like characteristics. One advantage of the present invention is that the elastomeric material takes on the fluid-like characteristics just long enough to penetrate the seam 40, but then sets up like a gel to prevent the elastomeric material from running or dripping out of the seam 40.

As shown in FIG. 8, the shear force provided by the sliding putty knife 56 which agitates the elastomeric material in bead 38 sufficient to fluidize the elastomeric material and drive the elastomeric material deeper into seam 40 toward wall stud 50. In this preferred method, putty knife 56 is slid along the longitudinal length of seam 40 at an oblique angle relative to the exposed surface of panel assembly 42. A portion of the elastomeric bead 38 is scraped off with putty knife 56; however, a substantial portion of the elastomeric material is driven into the seam. Seam 40 is filled with elastomeric material 38a and panel assembly 42 is left with a smooth exposed surface 58 bridging panel members 46 and 48. Scraping a small portion of the elastomeric bead 38 off of abutting edges 52, 54 of the panel assembly 42 is preferred because this method provides a smoother surface along the seam 40. Other methods, e.g., running a putty knife over the elastomeric bead 38, thereby spreading the elastomeric material over the surface of the panel members 46, 48, may result in a build-up of elastomeric material along the seam. This will result in a less even seam surface on the panel assembly 42. The excess elastomeric material may be removed as, for example, by sanding the panel assembly 42 along seam 40. Elastomeric material 38a is then allowed to cure in seam 40.

As shown in FIG. 9, a thin layer of mud 60 may be applied over elastomeric material 38a in the reinforced seam 40a to provide an improved surface for a paint composition. Although, paint may be applied directly to the cured elastomeric material, paint compositions will adhere better to mud layer 60. Further, paint compositions will appear more uniform across panel members 46 and 48 and reinforce seam 40a with mud layer 60 overlaying elastomeric material 38a, thus providing a smoother paint finish on the exposed surface of panel assembly 42.

FIG. 10 illustrates a reinforced seam in an alternative panel assembly. Panel members 46', 48' having tapered edged 52', 54', respectively, are well known in the art. In an alternative method of the present invention, a bead of elastomeric material is applied to the seam defined by tapered edges 52', 54' of the respective panels 46', 48'. The elastomeric material is then fluidized by subjecting the elastomeric material to a shearing stress and driving the elastomeric material into the seam, as described in the method above. A thin layer of mud 60 is applied over elastomeric material 38a, leaving a smooth exposed surface from the panel assembly.

Because the elastomeric materials used in the methods of the present invention are thixotropic, one advantage of the present invention is that the elastomeric material can be applied to horizontal, vertical, and overhead surfaces without significant dripping. Another advantage of the present invention is the rapid curing of the elastomeric material. As opposed to the typical tape and mud and sand method of filling a seam of a panel assembly which may take several hours or even days to complete, the method of the present invention fills and prepares a seam in a matter of minutes. Further, the method provides a reinforced seam which can withstand forces typically applied to the seam of a panel assembly, i.e., through expansion and contraction of the panel members or support members.

A preferred two-component polyurethane elastomeric material was especially formulated for the method of the present invention. It should be understood that the methods of the present invention may be performed using a single component, fluid, thixotropic polyurethane elastomeric material. These single-component polyurethane elastomeric materials comprise the isocyanate-terminated compound as described hereinbelow and can be moisture cured. Alternatively, the single component polyurethane material may include a solvent.

A single component, elastomeric, thixotropic isocyanate-terminated reactant according to the present invention is prepared by mixing a treated fumed silica (3% to 8%, preferably 4.0% Cab-O-Sil TS-720 from Cabot Corporation), a metal salt catalyst (0.04% to 0.20% Dabco T-12 from Air Products and Chemicals, Inc.), a viscosity reducer (0% to 10.0% Butyl Acetate from Union Carbide), a colorant consisting of titanium dioxide in a polyether polyol vehicle (0% to 5.0% 34-18000 White from Ferro Chemical), and an aromatic isocyanate quasi-prepolymer (balance) consisting of a polymeric isocyanate (Rubinate M from ICI Corporation) and a dihydroxyl-terminated propylene oxide-based polyether with a molecular weight of about 425 (PolyG 20-265 from Olin Chemical) and a trihydroxyl-terminated propylene oxide based polyether with a molecular weight of about 615 (PolyG 30-280 from Olin Chemical).

A thixotropic formulation was developed which does not substantially foam, has an extended rate of cure time and can be applied in the form of a bead. The polyurethane elastomeric material is preferably formulated for use at a relatively wide range of ambient temperatures, preferably between about 30° F. and 100° F. Humidity should not adversely affect the resultant bond. Finally, the method of this invention is also suitable for mass production of structural panel assemblies, including automated assembly processes. Thus, the elastomeric material preferably sets up and cures in a controlled manner. In most applications it is preferred that the elastomeric material cures in about 3–30 minutes. Most preferably, the elastomeric material should cure in 5 to 10 minutes at ambient temperature.

Suitable isocyanate-terminated compounds or polymers must have at least two terminal isocyanate groups and may be either aliphatic or aromatic in nature. The isocyanate-terminated compounds suitable for use in this invention have mean functionality of about 2 to 3.2 and contain about 15 to 35 weight percent isocyanate groups. Preferred isocyanate-terminated compounds are based on, or derived from, methylene diphenyl diisocyanate (MDI). Preferred isocyanate-terminated compounds are of the monomers or polymers of the general formula I:

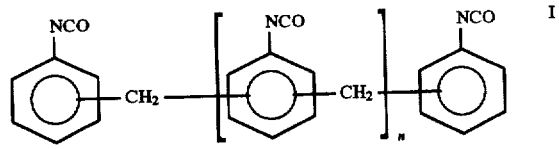

where n is an integer from 0 to about 10 and preferably from 0 to about 4. The isocyanate-terminated compound I is methylene diphenyl diisocyanate when n is zero and is a polymeric methylene diphenyl diisocyanate when n is greater than zero. Mixtures of the compounds I can also be used. In fact, a mixture containing compound I where n equals 0, is one preferred isocyanate-terminated compound. Preferably compound I is, when n equals 0, a mixture of the 4,4'-methylenediphenyl diisocyanate and the 2,4'-methylene diphenyl diisocyanate isomers. Often, this mixture will contain a small amount of the 2,2'-isomer (i.e., 2,2'-methylene diphenyl diisocyanate). Compound I with n greater than or equal to 1 is a linear polymer. As those skilled in the art will realize, branched polymers can also be used where methylene phenyl isocyanate group are attached directly to one or both of the phenyl rings in the methylene diphenyl diisocyanate structure. Mixtures of such linear and branched polymers can also be used. Other preferred isocyanate-terminated compounds are quasi-prepolymers of the general formula II:

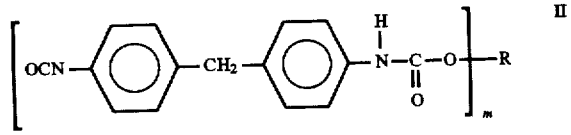

where m is equal to 2 or 3 and R represents an aliphatic polyether. The polymer II is an isocyanate-terminated quasi-prepolymer prepared by reacting a polymer as defined in formula I with a dihydroxyl-terminated or a trihydroxyl-terminated polyol.

Especially preferred polyols are the aliphatic polyether polyols. For example, reacting a hydroxyl-terminated polyether (HO-OH) with methylene diphenyl diisocyanate yields a isocyanate-terminated prepolymer as illustrated in the following equation:

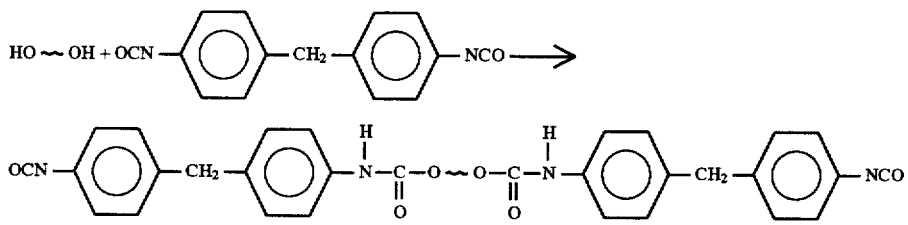

where — represents the aliphatic polyether portion. Examples of such aliphatic polyether groups include the following:

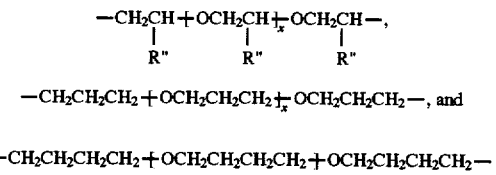

$-CH_2CH_2CH_2+OCH_2CH_2CH_2+_xOCH_2CH_2CH_2-$, and $-CH_2CH_2CH_2CH_2+OCH_2CH_2CH_2CH_2+OCH_2CH_2CH_2CH_2-$ and the like, where each R" is independently a hydrogen or a methyl radical. Thus, these polyether compounds are based on the polymerization of ethylene oxides, propylene oxides, butylene oxides, and the like. Preferably, x has an average value such that the molecular weight of the polyol portion is in the range of about 500 to 6000, and more preferably in the range of about 500 to 2500.

The quasi-prepolymers are prepared by reacting an excess of methylene diphenyl diisocyanate with a polyether polyol (terminated with either two or three hydroxyl groups) to obtain a liquid quasi-prepolymer. Generally an equivalent ratio for the reactants (as expressed in terms of —NCO to —OH) of about 2 to 1 or greater, respectively, is acceptable although the equivalent ratio of the reactants and the reaction conditions can be varied so long as the resultant quasi-prepolymer remains liquid at, or slightly above, room temperature. The quasi-prepolymers must contain sufficient free isocyanate groups to react with hydroxyl-terminated compounds when the actual elastomeric material is applied to the seam or void of the panel assembly. As the equivalent ratio of the reactants approaches about 1 to 1, solid quasi-prepolymers may result; such solid quasi-prepolymers would not be useful in the practice of this invention and should, therefore, be avoided. Two general methods have been found useful in the preparation of the quasi-prepolymers. Preferably, the quasi-prepolymers can be prepared in a controlled manner by adding the polyether polyol slowly to the diisocyanate at the reaction temperature (120° F. to about 160° F.) so as to insure a large excess of the diisocyanate during the reaction. The quasi-prepolymers can also be prepared by simply mixing the reactants together, and then reacting the reactants at a temperature from about room temperature to 160° F. for a time sufficient to prepare the desired quasi-prepolymer. The time required will, of course, depend on the reaction temperature; generally an overnight reaction time will be sufficient. Using either method, solvent is not required. In some cases, cooling of the reactants may be desirable in order to control the exotherm. Generally, such cooling is not needed at the lower reaction temperatures.

Isocyanate-terminated polymers suitable for use in the present invention are generally available commercially. Examples of such commercially available materials include isocyanates such as PAPI 2094 from Dow Chemical Company, MRS Series isocyanates from Miles Inc., Mondur ML from Miles, Inc.; uretonimine modified methylene diphenyl diisocyanates such as Mondur CD from Miles, Inc., Isonate 2143L from Dow Chemical Company and Rubinate 1680 from ICI Polyurethanes; quasi-prepolymers prepared from methylene diphenyl diisocyanates such as Mondur PF from Miles, Inc., Isonate 181 from Dow Chemical Company, and Rubinate 1790 from ICI Americas, Inc. Other commercially available isocyanate-terminated polymers may also be used. Examples of polyether polyols useful in preparing quasi-prepolymers of the present invention include PolyG 20-56, PolyG 20-112, PolyG 30-112, PolyG 85-36, PolyG 85-29, PolyG 20-265, and PolyG 76-120 from Olin Corporation. Especially preferred polyether polyols are the polypropylene oxide polyetherdiols and ethylene oxide-capped polyether triols. Similar polyether polyols from other suppliers may also be used to prepare the quasi-prepolymers.

The hydroxyl-terminated compounds suitable for use in this invention are generally polyether polyols, and diol, triol chain extenders and cross linkers. The polyether polyols suitable for use in this invention are polypropylene oxide polyetherdiols and polyethertriols; ethylene oxide-capped polypropylene oxide polyetherdiols and polyethertriols; and aliphatic or aromatic amine-initiated, polypropylene oxide extended polyols. Examples of polyether polyols useful in preparing hydroxyl-terminated compounds of the present invention are PolyG 20-56, PolyG 20-112, PolyG 30-112, PolyG 85-36, PolyG 20-265, PolyG 85-29, and PolyG 76-120 from Olin Corporation, and Multranol 9138, Multranol 9144, and Multranol 9181 from Bayer, Inc. The diol and triol chain extenders and cross linkers suitable for use in this invention are generally glycols such as 1,4-butanediol and diethylene glycol, and glycerine.

The isocyanate-terminated compound is present in the first thixotropic component of the present invention in an amount of at least about 90%, preferably from bout 92% to 97%, by weight of the first component. The hydroxyl-terminated component is present in the second thixotropic component of the present invention in an amount of from about 35% to 85%, preferably from about 50% to 70%, by weight of the second component.

Of course, mixtures of suitable isocyanate-terminated compounds and mixtures of suitable hydroxyl-terminated compounds can be used and are often preferred. Generally equivalent amounts (i.e., 1 to 1 ratios based on the reactive isocyanate and hydroxyl contents) of the isocyanate material and the hydroxyl material are mixed directly in the dispense gun assembly and the resultant reacting mixture is applied to the seam or void of the panel assembly.

As noted above, the preferred thixotropic polyurethane elastomeric material used in the method of the present invention is prepared by mixing and reacting a first thixotropic component comprising an isocyanate-terminated compound with a second thixotropic component comprising a hydroxyl-terminated compound containing at least two reactive hydroxyl groups wherein the mixing and reacting occurs immediately before application to the substrate. Thus, the preferred elastomeric material used in the method of the present invention is a thixotropic mixture, made from two individually thixotropic components. The isocyanate-terminated compound is made thixotropic preferably by the addition of fumed silica. The second thixotropic component containing a hydroxyl-terminated compound preferably also contains fumed silica. Preferably, this fumed silica is treated so as to make it hydrophobic. This hydrophobicity reduces the risk that moisture will be present in the fumed silica. This is advantageous because moisture will react with the isocyanate-terminated compound during the reaction phase, degrading the physical properties of the polyurethane elastomeric material, and causing the elastomeric material to bubble or foam. An example of a treated fumed silica useful in the thixotropic components used in the method of the present invention is Cab-O-Sil TS-720 from Cabot Corporation. Fumed silica is present in the first and second thixotropic components in an amount of from about 3% to 8%, preferably about 4% to 7%, by weight of the first or second component. The fumed silica has good long term stability and improves the adhesion properties of the elastomeric material.

The second component of the elastomeric material containing the hydroxyl-terminated compounds of the present invention also contains a filler to increase cost-effectiveness and to modify the physical characteristics of the polyurethane elastomeric material. A number of criteria are used to select appropriate fillers for the present invention. Flow, paintability, and sandability characteristics of the present invention are ultimately affected by the choice of fillers. If the particle size of the filler is too large, the surface of the polyurethane elastomeric material is grainy and hard to make smooth. If the particle size is too small, the hydroxyl-terminated compound containing component becomes too thick and does not flow well. Preferably, the average particle size of the fillers used in the present invention ranges from about 0.2 to 200 microns, most preferably from about 5 to 20 microns. Bulk density of the inorganic filler should also be considered. If a sufficient amount of filler is added to the hydroxyl-terminated compound to make it truly cost effective, but the bulk density of the inorganic filler is too low, the compound becomes too thick and does not flow well. Preferably, the bulk density of the fillers used in the present invention ranges from about 5 to 100 pounds per cubic foot, most preferably from about 40 to 80 pounds per cubic foot. Compatibility with the hydroxyl-terminated formula package is also very important. For example, barium sulfate was screened as a filler but was found to poison the catalyst system. Preferably, inorganic fillers of the present invention are surface treated to increase the adhesion between filler and the polyurethane elastomeric material polymer matrix. This increases the physical strength of the elastomeric material. Most preferably, inorganic fillers of the present invention are surface treated with organosilanes.

Filler is present in the second thixotropic component in an amount of from about 10% to about 50%, preferably from about 15% to 35%, by weight of the second component. Examples of suitable fillers include 400 Wollastakup, a surface treated calcium meta-silicate from Nyco Minerals, Inc., Unamine A-30 from Unimin Specialty Minerals, Inc., and HP-410 talc from Grefco, Inc. The preferred average particle size of these fillers range from about 5 to 70 microns.

The second thixotropic component used in the method of the present invention also contains catalyst to control the cure rate of the polyurethane elastomeric material. Suitable catalysts will be insensitive to other components of the hydroxyl-terminated compound, and will drive the hydroxyl-isocyanate reaction preferably to the water-isocyanate reaction. Bismuth salts are particularly useful in this application. Tertiary amine catalysts, although useful herein, were examined but found to offer no stability improvements over the bismuth salts, and in fact were found to be more moisture sensitive. Tin salts are also useful but are difficult to use in controlling the process window of the reaction between the hydroxyl and isocyanate-terminated compounds. Changes in tin salt levels as small as 1 part per 1,000 can drastically change the cure rate of the polyurethane elastomeric material. Tin salts are useful when a very fast reacting system is desired.

Catalyst is present in the second thixotropic component of the present invention in an amount of from about 0.04% to 0.2%, preferably from about 0.06% to 0.13%, by weight of the second component. Examples of suitable catalysts include Catalyst 310 (20% Bismuth) from OMG, and Coscat 83 (28% Bismuth) from Cosan Chemical.

The hydroxyl-terminated compounds of the present invention may contain a moisture scavenger to remove residual moisture and reduce the moisture sensitivity of the polyurethane elastomeric material during the reaction process. If moisture is present in the system the elastomeric material will foam and suffer from reduced physical properties and cosmetic appearance.

The level of moisture scavengers present in the second thixotropic component is from about 1% to 9%, preferably from about 2% to 5%, by weight of the second component. Examples of suitable moisture scavengers include Baylith L Powder (zeolite) from Bayer Inc., and 3A molecular sieve from Aldrich Chemical.

Various additives can be included in the isocyanate reactants and/or the hydroxyl reactants. For example, organic or inorganic colorants can be added to either reactants. By using colored dyes or colorants, the effectiveness of the mixing of the dispense gun assembly and application on the substrate can be determined visually: an elastomeric of uniform color will generally indicate acceptable mixing and proper operation the application equipment. Examples of suitable dyes include 57AB Black, X17AB Blue, X38 Orange, X52 Red, and X17 Yellow from Milliken Chemical. Examples of suitable colorants include titanium dioxide, e.g., 34-18000 White, and 34-88030 Black from Ferro Chemical. Other commercially available dyes or colorants can be used so long as they are compatible with the reactants and other components. Preferably, as in the case of 34-18000 White and 34-88030 Black from Ferro Chemical, the colorants are dispersed in a hydroxyl-terminated vehicle, or as in the case of the dyes from Milliken Chemical, are hydroxyl-terminated themselves. Dye or colorants are typically present in an amount of from about 1% to 5%, by weight.

Other additives, including light stabilizers, UV absorbers, anti-oxidants, and other processing aids or enhancers, are also preferably employed. Generally it is preferred to incorporate such additional components into the hydroxyl-terminated reactants. Examples of suitable light stabilizers include hindered amines such as Tinuvin 765 (bis (1,2,2,6, 6-pentamethyl-4-piperidinyl) sebacate) and Tinuvin 770 (bis (2,2,6,6-tetramenthyl-4-piperidyl)sebacate) from Ciba-Geigy. Examples of suitable UV light absorbers include Tinuvin 328 and Tinuvin 571 from Ciba-Geigy (both are substituted benzotraiazoles). Examples of suitable antioxidants and thermal stabilizers include Irganox 259 (hexamethylene bis (3,5-di-tert-butyl -4-hydroxyhydro cinnamate), Irganox 1010 (tetrakis [methylene (3,5-di-tert-butyl-4-hydoxyhydro cinnamate)] methane), and Irganox 1330 (1,3,5-trimethyl-2,3,6-tris (3,5-di-tert-butyl-4-hydroxybenzyl) benzene) from Ciba-Geigy. Light stabilizers, if used, will normally be present at about 0.2 to 0.75 weight percent in the hydroxyl-terminated reactants. UV light absorbers, if used, will normally be present at about 0.2 to 0.75 weight percent in the amine reactants. Antioxidants or thermal stabilizers, if used, will normally be present at about 0.1 to 0.5 weight percent in the amine reactants. Other conventional light stabilizers, UV light absorbers, antioxidants and thermal stabilizers can also be used in place of, or in addition to, the specific examples given.

The following examples are intended to further illustrate the invention and not to limit the invention. Unless specified otherwise, all percentages in the following examples are by weight.

EXAMPLE 1

A polyurethane elastomeric material is prepared as follows. A thixotropic isocyanate reactant consists of treated fumed silica (5.0%; Cab-O-Sil TS-720 from Cabot Corporation) and an aromatic isocyanate quasi-prepolymer (95.0%; Mondur PF from Bayer, Inc.). A thixotropic hydroxyl reactant consists of a dihydroxyl-terminated propylene oxide-based polyether with a molecular weight of about 2000 (39.37%; PolyG 20-56 from Olin Chemical), an amine-initiated propylene oxide-extended hydroxyl-terminated polyol (14.00%; Multranol 9138 from Bayer, Inc.), a metal salt catalyst (0.13%; Coscat 83 from Cosan Chemical), a zeolite moisture scavenger (2.00%; Baylith L Powder from Bayer, Inc.), a colorant consisting of titanium dioxide in a polyether polyol vehicle (3.50%; 34-18000 White from Ferro Chemical), a treated calcium meta-silicate inorganic filler (35.00%; 400 Wollastakup 10012 from Nyco Minerals, Inc.), and treated fumed silica (6.0%; Cab-O-Sil TS-720 from Cabot Corporation). The two components are combined in a dispense gun assembly (400 Autogun from TAH Industries and a Series 160 mixing nozzle) at a ratio of isocyanate reactant to hydroxyl reactant of 1:2 parts by volume to create a non-foamed, thixotropic polyurethane elastomeric material. The elastomeric material has excellent adhesion to wood, gypsum panels, concrete, and aluminum. The elastomeric material exhibits minimum shrinkage to effectively fill voids and exhibits good tensile and elongation properties. The elastomeric material is dispensed from the dispense gun assembly over the seam of a panel assembly defined by the co-planar, edge-abutting panel members of the panel assembly. A putty knife is slid along the longitudinal length of the seam of the panel assembly, scraping a small portion of the elastomeric material. The elastomeric material substantially fills the seam in the panel assembly and leaves a smooth exposed seam surface between the panel members of the panel assembly.

EXAMPLE 2

A polyurethane elastomeric material is prepared as follows. A thixotropic isocyanate reactant consists of treated fumed silica (5.0%; Cab-O-Sil TS-720 from Cabot Corporation) and a blend of aliphatic isocyanate quasi-prepolymers (75%; Airthane APC504 and 20.0%; Airthane APC-317 both from Air Products and Chemicals). A thixotropic hydroxyl reactant consists of a dihydroxyl-terminated propylene oxide-based polyether with a molecular weight of about 2000 (43.90%; PolyG 20-56 from Olin Chemical), an amine-initiated propylene oxide-extended hydroxyl-terminated polyol (14.00%; Multranol 9138 from Bayer, Inc.), a metal salt catalyst (0.10%; Coscat 83 from Cosan Chemical), a colorant consisting of titanium dioxide in a polyether polyol vehicle (2.00%; 34-18000 White from Ferro Chemical), a treated calcium meta-silicate inorganic filler (35.00%; 400 Wollastakup 10012 from Nyco Minerals, Inc.), and treated fumed silica (5.0%; Cab-O-Sil TS-720 from Cabot Corporation). The two components are combined in a dispense gun assembly (400 Autogun from TAH Industries and a Series 160 mixing nozzle) at a ratio of isocyanate reactant to hydroxyl reactant of 1:1 parts by volume to create a light, stable, non-foamed, thixotropic polyurethane elastomeric material. The elastomeric material is suitable for outdoor use, with improved physical properties and color retention properties.

COMPARATIVE EXAMPLE 3

A polyurethane elastomeric material was prepared as follows. An isocyanate-terminated reactant consists of an aromatic isocyanate quasi-prepolymer (100.0%; Mondur PF from Bayer, Inc.). Treated fumed silica was not added to the isocyanate compound and was not, therefore, thixotropic. A thixotropic hydroxyl reactant consisted of a dihydroxyl-terminated propylene oxide-based polyether with a molecular weight of about 2000 (63.00%; PolyG 20-56 from Olin Chemical), an amine initiated propylene oxide-extended hydroxyl-terminated polyol (6.00%; Multranol 9138 from Bayer, Inc.), a metal salt catalyst (0.10%; Coscat 83 from Cosan Chemical), an inorganic filler (25.00%; Barytes, Barium Sulfate), and treated fumed silica (6.0%; Cab-O-Sil TS-720 from Cabot Corporation). The reactants are mixed as in Example 2. The resultant material was found to be too soft and had poor physical properties. This was due to the low level, as well as the type, of inorganic filler in the hydroxyl reactant and the absence of fumed silica in the isocyanate reactant. Barium sulfate is not as hard as calcium meta-silicate. Since the barium sulfate was untreated, the inorganic filler was not well-bonded to the polymer matrix, resulting in poor physical properties.

EXAMPLE 4

A polyurethane elastomer material is prepared as follows. A thixotropic isocyanate reactant consists of treated fumed silica (5.0%; Cab-O-Sil TS-720 from Cabot Corporation) and an aromatic isocyanate quasi-prepolymer (95.0%; Mondur PF from Bayer, Inc.). A thixotropic hydroxyl reactant consists of a dihydroxyl-terminated propylene oxide-based polyether with a molecular weight of about 2000 (57.375%; PolyG 20-56 from Olin Chemical), an amine initiated propylene oxide-extended hydroxyl-terminated polyol (11.50%; Multranol 9138 from Bayer, Inc.), a metal salt catalyst (0.125%; Coscat 83 from Cosan Chemical), a treated barium sulfate inorganic filler (25.00%; Bartex 80 from Mitox Corporation of America), and treated fumed silica (6.0%; Cab-O-Sil TS-720 from Cabot Corporation). The reactants are mixed as in Example 2. The elastomeric material has good thixotropic characteristics. However, the reactivity profile diminishes over time (i.e., has poor shelf life) due to the treated barium sulfate poisoning the catalyst.

COMPARATIVE EXAMPLE 5

A polyurethane elastomer material is prepared as follows. A thixotropic isocyanate reactant consists of treated fumed silica (5.0%; Cab-O-Sil TS-720 from Cabot Corporation)

and an aromatic isocyanate quasi-prepolymer (95.0%; Mondur PF from Bayer, Inc.). A thixotropic hydroxyl reactant is consists of a dihydroxyl-terminated propylene oxide-based polyether with a molecular weight of about 2000 (44.70%; PolyG 20-56 from Olin Chemical), an amine initiated propylene oxide-extended hydroxyl-terminated polyol (14.00%; Multranol 9138 from Bayer, Inc.), an amine catalyst (0.30%; Dabco 33LV from Air Products and Chemicals), a treated barium sulfate inorganic filler (25.00%; Bartex OWT from Mitox Corporation of America), and treated fumed silica (6.0%; Cab-O-Sil TS-720 from Cabot Corporation). Water, at a level of 0.25%, is allowed to poison the hydroxyl reactant. It was found that the material foamed due to residual water. It is also felt that the foaming is aggravated by the presence of an amine catalyst.

EXAMPLE 6

A polyurethane elastomeric material is prepared as follows. A thixotropic isocyanate reactant consists of treated fumed silica (6.0%; Cab-O-Sil TS-720 from Cabot Corporation) and an aromatic isocyanate quasi-prepolymer consisting of a polymeric isocyanate and a dihydroxyl-terminated propylene oxide-based polyether with a molecular weight of about 1000 (78.3%; Rubinate M form ICI Corporation, 15.7%; PolyG 20-112 from Olin Chemical). A thixotropic hydroxyl reactant consists of a dihydroxyl-terminated propylene oxide based polyether with a molecular weight of about 2000 (48.925%; PolyG 20-56 form Olin Chemical), an amine-initiated propylene oxide-extended hydroxyl-terminated polyol (14.0%; Multranol 9138 from Bayer, Inc.), a metal salt catalyst (0.075%; Coscat 83 from Cosan Chemical), a zeolite moisture scavenger (2.0%; Baylith L Powder from Bayer, Inc.), a colorant consisting of titanium dioxide in a polyether polyol vehicle (5.0%; 34-18000 White from Ferro Chemical), a treated calcium meta-silicate inorganic filler (25.0%; 400 Wollastokup 10012 from Nyco Minerals, Inc.), and a treated fumed silica (5.00%; Cab-O-Sil TS-720 from Cabot Corporation.) The two components are mixed in a dispense gun assembly (400 Autogun and a Series 160 mixing nozzle from TAH Industries) at a ratio of isocyanate reactant to hydroxly reactant at 1:2 parts by volume to produce a non-foaming, thixotropic polyurethane elastomeric material. The elastomeric material has excellent adhesion to wood, gypsum panels, concrete, and aluminum. The elastomeric material exhibits minimum shrinkage to effectively fill voids and exhibits good tensile and elongation properties. The elastomeric material is dispensed from the static mixer nozzle assembly of the dispense gun over the seam of a panel assembly defined by the co-planar, edge-abutting panel members of the panel assembly. A putty knife is slid along the longitudinal length of the seam of the panel assembly, scrapping off a small portion of the elastomeric material while driving the major portion of elastomeric material into the seam. The elastomeric material substantially fills the seam in the panel assembly and leaves a smooth exposed seam surface between the panel members of the panel assembly. Once the elastomeric material cures, it can be sanded to produce an additionally smooth surface profile and then painted.

A preferred description of this invention has been disclosed; however, a worker of ordinary skill in the art would recognize that certain modifications would come within the scope of this invention. For that reason, the following claims should be studied in order to determine the true scope and content of this invention.

We claim:

1. A method of filling a seam of a structural panel assembly having a plurality of panel members and a plurality of support members, said seam defined by edges of abutting panel members, said method comprising the steps of:

forming a fast-curing, liquid, non-foaming thixotropic polyurethane elastomeric material by reacting an isocyanate-terminated compound having at least two reactive isocyanate groups, wherein said isocyanate-terminated compound includes, by weight, from about 3% to 8% fumed silica, and a hydroxyl-terminated compound including from about 3% to 8% fumed silica and from about 10% to 50% filler;

applying said thixotropic polyurethane elastomeric material over said seam of said panel assembly;

fluidizing said thixotropic polyurethane elastomeric material and driving said thixotropic polyurethane elastomeric material into said seam of said panel assembly; and allowing said thixotropic polyurethane elastomeric material to cure in said seam, thereby sealing and reinforcing said seam of said panel assembly.

2. A method as defined in claim 1, wherein the step of forming a fast-curing, liquid, non-foaming thixotropic polyurethane elastomeric material includes rapidly mixing and initiating the reaction of a first thixotropic component comprising said isocyanate-terminated compound and a second thixotropic component comprising a hydroxyl-terminated compound having at least two reactive hydroxyl groups, wherein said first thixotropic component includes from about 3% to 8% by weight fumed silica and said second thixotropic component includes from about 3% to 8% by weight fumed silica and from about 10% to 50% filler.

3. A method as defined in claim 2, said method including rapidly mixing and initiating the reaction of said first thixotropic component comprising a monomeric or polymeric methylene diphenyl diisocyanate or a mixture of monomeric or polymeric methylene diphenyl diisocyanate of the general formula

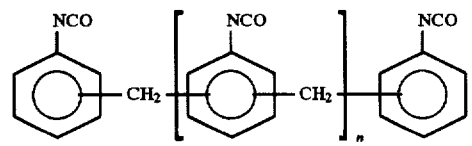

where n is an integer from 0 to about 10, and about 4% to 7% hydrophobic fumed silica with said second thixotropic component.

4. A method as defined in claim 2, said method including rapidly mixing and initiating the reaction of said first thixotropic component comprising a quasi-prepolymer or mixture of quasi-prepolymers of the general formula

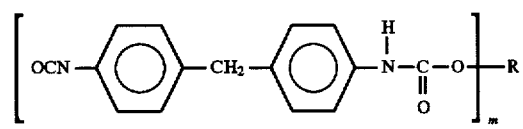

where m is equal to 2 or 3 and R is an aliphatic polyether and from about 4% to 7% hydrophobic fumed silica with said second thixotropic component.

5. A method as defined in claim 2, said method including rapidly mixing and initiating the reaction of said first thixotropic component with said second thixotropic component wherein said second thixotropic component comprising said hydroxyl-terminated compound is selected from the group consisting of polypropylene oxide polyetherdiols and polyethertriols, ethylene oxide-capped polypropylene oxide polyetherdiols and polyethertriols, and aliphatic or aromatic amine-initiated, polypropylene oxide extended polyols, and mixtures thereof from about 4% to 7% hydrophobic fumed silica and from about 15% to 35% filler.

6. A method as defined in claim 1, wherein the step of applying said thixotropic polyurethane elastomeric material includes laying a substantially continuous, linear bead of said thixotropic polyurethane elastomeric material along said seam of said panel assembly.

7. A method as defined in claim 1, wherein the step of fluidizing said thixotropic polyurethane elastomeric material includes subjecting said thixotropic polyurethane elastomeric material to a shearing stress by sliding a putty knife at an oblique angle longitudinally along said seam, thereby fluidizing said thixotropic polyurethane elastomeric material, driving said thixotropic polyurethane elastomeric material into said seam and filling said seam with said thixotropic polyurethane elastomeric material.

8. A method as defined in claim 1, said method further including applying a relatively thin layer of joint compound over said filled seam.

9. A method of filling a seam of a structural panel assembly having a plurality of panel members, said seam defined by edges of abutting panel members, said method comprising the steps of:

forming a fast-curing, fluid, two-component, non-foaming thixotropic polyurethane elastomeric material by rapidly mixing and initiating the reaction of a first thixotropic component comprising an isocyanate-terminated compound having at least two reactive isocyanate groups and a second thixotropic component comprising a hydroxyl-terminated compound having at least two reactive hydroxyl groups, wherein said first thixotropic component includes from about 3% to 8% by weight fumed silica and said second thixotropic component includes from about 3% to 8% by weight fumed silica and from about 10% to 50% filler;

applying said thixotropic polyurethane elastomeric material over said seam of said panel assembly;

fluidizing said thixotropic polyurethane elastomeric material and driving said thixotropic polyurethane elastomeric material into said seam of said panel assembly; and allowing said thixotropic polyurethane elastomeric material to cure in said seam, thereby sealing and reinforcing said seam of said panel assembly.

10. A method as defined in claim 9, wherein said panel members of said panel assembly have adjacent side edges in abutting edge-to-edge co-planar relation.

11. A method as defined in claim 9, wherein said seam is supported by a support member.

12. A method as defined in claim 9, said method including laying a substantially continuous and linear, relatively thin bead of said thixotropic polyurethane elastomeric material over said seam.

13. A method as defined in claim 12, wherein laying a thin bead of said thixotropic polyurethane elastomeric material includes dispensing said thixotropic polyurethane elastomeric material through a static mixer nozzle assembly of a dispense gun apparatus, said static mixer nozzle assembly comprising an elongate tube having a spout and an entry port, and a plurality of helical members disposed longitudinally in said tube between said spout and said entry port, each of said members turned 90° relative to adjacent helical members.

14. A method as defined in claim 9, wherein the method includes subjecting said thixotropic polyurethane elastomeric material to a shearing stress, thereby fluidizing said thixotropic polyurethane elastomeric material, driving said thixotropic polyurethane elastomeric material into said seam and filling said seam with said thixotropic polyurethane elastomeric material.

15. A method as defined in claim 14, wherein the method includes sliding a putty knife at an oblique angle longitudinally along said seam, thereby scraping off a portion of said thixotropic polyurethane elastomeric material, driving the remainder of said thixotropic polyurethane elastomeric material into said seam.

16. A method as defined in claim 9, said method further including applying a relatively thin layer of joint compound over said filled seam.

17. A method as defined in claim 9, said method including rapidly mixing and initiating the reaction of said first thixotropic component comprising a monomeric or polymeric methylene diphenyl diisocyanate or a mixture of monomeric or polymeric methylene diphenyl diisocyanate of the general formula

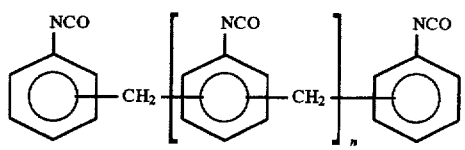

where n is an integer from 0 to about 10, and about 4% to 7% hydrophobic fumed silica with said second thixotropic component.

18. A method as defined in claim 9, said method including rapidly mixing and initiating the reaction of said first thixotropic component comprising a quasi-prepolymer or mixture of quasi-prepolymers of the general formula

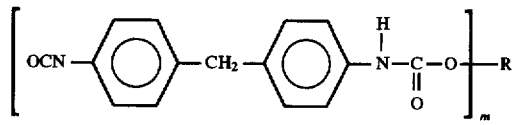

where m is equal to 2 or 3 and R is an aliphatic polyether and from about 4% to 7% hydrophobic fumed silica with said second thixotropic component.

19. A method as defined in claim 9, said method including rapidly mixing and initiating the reaction of said first thixotropic component with said second thixotropic component wherein said second thixotropic component comprising said hydroxyl-terminated compound is selected from the group consisting of polypropylene oxide polyetherdiols and polyethertriols, ethylene oxide-capped polypropylene oxide polyetherdiols and polyethertriols, and aliphatic or aromatic amine-initiated polypropylene oxide extended polyols, and mixtures thereof from about 4% to 7% hydrophobic fumed silica, and from about 15% to 35% filler.

20. A method as defined in claim 9, wherein said method includes rapidly mixing and initiating the reaction of said first thixotropic component and said second thixotropic component wherein said second thixotropic component comprising said hydroxyl-terminated compound further comprises from about 4% to 7% hydrophobic fumed silica and from about 15% to 35% filler, wherein said filler has an average particle size to about 0.2 to 200 microns and a bulk density from about 5 to 100 per cubic foot.

21. A method as defined in claim 20, wherein said second thixotropic component further comprises from about 0.04% to 0.2%, by weight, catalyst.

22. A method as defined in claim 20, wherein said second thixotropic component further comprises from about 1% to 9%, by weight, moisture scavenger.

23. A method as defined in claim 20, wherein said second thixotropic component further comprises an additive selected from the group consisting of colorants, light stabilizers, UV absorbers, anti-oxidants, thermostabilizers and mixtures thereof.

24. A method of forming a structural panel assembly having a reinforced seam, said method comprising the steps of:
    forming a panel assembly comprising a plurality of panel members having adjacent side edges in abutting edge-to-edge co-planar relation, said edges defining a seam therebetween and a plurality of structural support members abutting and supporting said panel members;
    preparing a fast-curing, non-foaming, two-component, thixotropic polyurethane elastomeric material, by rapidly mixing and initiating the reaction of an isocyanate-initiated compound having at least two reactive isocyanate groups and a hydroxyl-terminated compound having at least two reactive hydroxyl groups, wherein said isocyanate-terminated compound includes, by weight, from about 3% to 8% hydrophobic fumed silica and said hydroxyl-terminated compound includes, by weight, from about 3% to 8% hydrophobic fumed silica and from about 10% to 50% filler;
    laying a relatively thin bead of said thixotropic polyurethane elastomeric material over said seam; and
    filling and sealing said seam with said thixotropic polyurethane elastomeric material by fluidizing said bead of said thixotropic polyurethane elastomeric material, driving said bead of thixotropic polyurethane elastomeric material into said seam, and allowing said thixotropic polyurethane elastomeric material to cure in said seam.

25. A method as defined in claim 24, wherein laying a thin bead of said thixotropic polyurethane elastomeric material includes dispensing said thixotropic polyurethane elastomeric material through a static mixer nozzle assembly of a dispense gun apparatus, said static mixer nozzle assembly comprising an elongate tube having a spout and an entry port, and a plurality of helical members disposed longitudinally in said tube between said spout and said entry port, each of said members turned 90° relative to adjacent helical members.

26. A method as defined in claim 24, wherein the method includes subjecting said thixotropic polyurethane elastomeric material to a shearing stress, thereby fluidizing said thixotropic polyurethane elastomeric material, driving said thixotropic polyurethane elastomeric material into said seam and filling said seam with said thixotropic polyurethane elastomeric material.

27. A method as defined in claim 26, wherein the method includes sliding a putty knife at an oblique angle longitudinally along said seam, thereby scraping off a portion of said thixotropic polyurethane elastomeric material, driving the remainder of said thixotropic polyurethane elastomeric material into said seam.

28. A method as defined in claim 24, said method further including applying a relatively thin layer of joint compound over said seam.

29. A method as defined in claim 24, said method including rapidly mixing and initiating the reaction of said isocyanate-terminated compound comprising a monomeric or polymeric methylene diphenyl diisocyanate or a mixture of monomeric or polymeric methylene diphenyl diisocyanate of the general formula

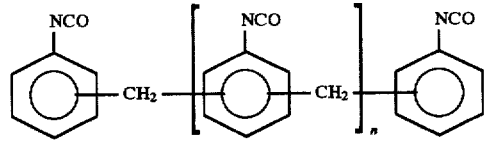

where n is an integer from 0 to about 10 with about 4% to 7% hydrophobic fumed silica and said hydroxyl-terminated compound.

30. A method as defined in claim 24, said method including rapidly mixing and initiating the reaction of said isocyanate-terminated compound comprising a quasi-prepolymer or mixture of quasi-prepolymers of the general formula

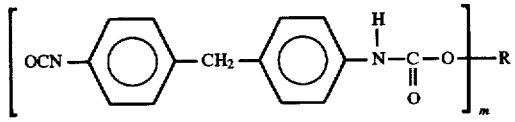

where m is equal to 2 or 3 and R is an aliphatic polyether and from about 4% to 7% hydrophobic fumed silica with said hydroxyl-terminated compound.

31. A method as defined in claim 24, said method including rapidly mixing and initiating the reaction of said isocyanate-terminated compound and said hydroxyl-terminated compound, wherein said hydroxyl-terminated compound is selected from the group consisting of polypropylene oxide polyetherdiols and polyethertriols, ethylene oxide-capped polypropylene oxide polyetherdiols and polyethertriols, and aliphatic or aromatic amine-initiated, polypropylene oxide extended polyols, and mixtures thereof and further includes from about 4% to 7% hydrophobic fumed silica and from about 15% to 35% filler.

32. A method as defined in claim 24, wherein said method includes rapidly mixing and initiating the reaction of said isocyanate-terminated compound and said hydroxyl-terminated compound, wherein said hydroxyl-terminated compound comprises from about 4% to 7% hydrophobic fumed silica and from about 15% to 35% filler, wherein said filler has an average particle size of from about 5 to 100 microns and a bulk density of from about 40 to 80 lbs. per cubic foot.

33. A method as defined in claim 24, wherein said hydroxyl-terminated compound further comprises from about 0.04% to 0.2%, by weight, catalyst.

34. A method as defined in claim 24, wherein said hydroxy-terminated compound further comprises from about 1% to 9%, by weight, moisture scavenger.

35. A method as defined in claim 24, wherein said hydroxyl-terminated compound further comprises an additive selected from the group consisting of colorants, light stabilizers, UV absorbers, and anti-oxidants, thermostabilizers and mixtures thereof.

* * * * *